(12) United States Patent
Jinda et al.

(10) Patent No.: US 10,180,099 B2
(45) Date of Patent: Jan. 15, 2019

(54) HEAT INSULATING STRUCTURE FOR EXHAUST JUNCTION PIPE

(71) Applicant: FUTABA INDUSTRIAL CO., LTD., Okazaki-shi, Aichi (JP)

(72) Inventors: Masahiro Jinda, Okazaki (JP); Munehiro Tsubosaka, Okazaki (JP); Takuya Kondo, Okazaki (JP); Shinnosuke Toichi, Okazaki (JP); Toshikazu Namikiri, Okazaki (JP); Manabu Yokoyama, Okazaki (JP)

(73) Assignee: FUTABA INDUSTRIAL CO., LTD, Okazaki-shi (JP)

( * ) Notice: Subject to any disclaimer, the term of this patent is extended or adjusted under 35 U.S.C. 154(b) by 0 days.

(21) Appl. No.: 15/301,121

(22) PCT Filed: Mar. 30, 2015

(86) PCT No.: PCT/JP2015/059984
§ 371 (c)(1),
(2) Date: Sep. 30, 2016

(87) PCT Pub. No.: WO2015/152172
PCT Pub. Date: Oct. 8, 2015

(65) Prior Publication Data
US 2017/0016377 A1   Jan. 19, 2017

(30) Foreign Application Priority Data
Mar. 31, 2014   (JP) .................................. 2014-070903

(51) Int. Cl.
*F01N 13/14*   (2010.01)
*F01N 13/08*   (2010.01)
(Continued)

(52) U.S. Cl.
CPC ............... *F01N 13/14* (2013.01); *F01N 3/10* (2013.01); *F01N 13/009* (2014.06);
(Continued)

(58) Field of Classification Search
CPC ...... F01N 13/011; F01N 3/10; F01N 13/1805; F01N 13/14; F01N 13/009
(Continued)

(56) References Cited

U.S. PATENT DOCUMENTS

| 4,031,700 A | 6/1977 | Yamazaki et al. |
| 6,907,726 B2 * | 6/2005 | Kim ........................ F01N 13/14 60/313 |
| 2004/0194456 A1 | 10/2004 | Kim |

FOREIGN PATENT DOCUMENTS

| CN | 1536208 | 10/2004 |
| JP | 76217/1976 | 6/1976 |

(Continued)

OTHER PUBLICATIONS

English translation of International Preliminary Report on Patentability from corresponding PCT Appln. No. PCT/JP2015/059984 dated Oct. 16, 2016.
(Continued)

*Primary Examiner* — Tom P Duong
(74) *Attorney, Agent, or Firm* — Grossman, Tucker, Perreault & Pfleger, PLLC (57) ABSTRACT

A heat insulating structure for an exhaust junction pipe to be disposed in an area in which exhaust gas passages having different respective lengths are merged together comprises a first heat insulation portion that covers and provides heat insulation for at least a portion of one branch part of branch parts that are branched in the exhaust junction pipe; the one branch part forms one exhaust gas passage in a not-yet-
(Continued)

merged state of the exhaust gas passages, and forms the one exhaust gas passage having a short length.

13 Claims, 7 Drawing Sheets

(51) Int. Cl.
*F01N 13/00* (2010.01)
*F16L 59/16* (2006.01)
*F01N 3/10* (2006.01)
*F01N 13/18* (2010.01)

(52) U.S. Cl.
CPC ............ *F01N 13/011* (2014.06); *F01N 13/08* (2013.01); *F01N 13/1805* (2013.01); *F16L 59/161* (2013.01)

(58) Field of Classification Search
USPC ........................................ 422/168, 179, 177
See application file for complete search history.

(56) References Cited

FOREIGN PATENT DOCUMENTS

| | | |
|---|---|---|
| JP | 60-159814 | 10/1985 |
| JP | 5-96432 | 4/1993 |
| JP | 75429/1993 | 10/1993 |
| JP | 2004-308641 | 11/2004 |
| JP | 2005-120854 | 5/2005 |

OTHER PUBLICATIONS

Office Action from dated Chinese Appln. No. 201580017994.0 dated Jul. 3, 2017. English translation attached.
Office Action from related Japanese Appln. No. 2016-511893 dated Jun. 13, 2017. English translation attached.
English translation of International Search Report from corresponding PCT Appln. No. PCT/JP2015/059984 dated May 19, 2015.
English translation of Written Opinion from corresponding PCT Appln. No. PCT/JP2015/059984 dated May 19, 2015.

* cited by examiner

HEAT INSULATING STRUCTURE FOR EXHAUST JUNCTION PIPE

CROSS-REFERENCE TO RELATED APPLICATIONS

This international application claims the benefit of Japanese Patent Application No. 2014-70903 filed Mar. 31, 2014 in the Japan Patent Office, and the entire disclosure of Japanese Patent Application No. 2014-70903 is incorporated herein by reference.

TECHNICAL FIELD

The present invention relates to a heat insulating structure for an exhaust junction pipe.

BACKGROUND ART

As an internal combustion engine of a vehicle, a high-performance internal combustion engine, including a V-type engine, is sometimes used.

Such a high-performance internal combustion engine is often mounted in a vehicle such that a crankshaft is placed in a direction traverse to a travelling direction of the vehicle (i.e., "transversely placed"). In this case, pistons are arranged at the front and back of the crankshaft.

Figure 5:
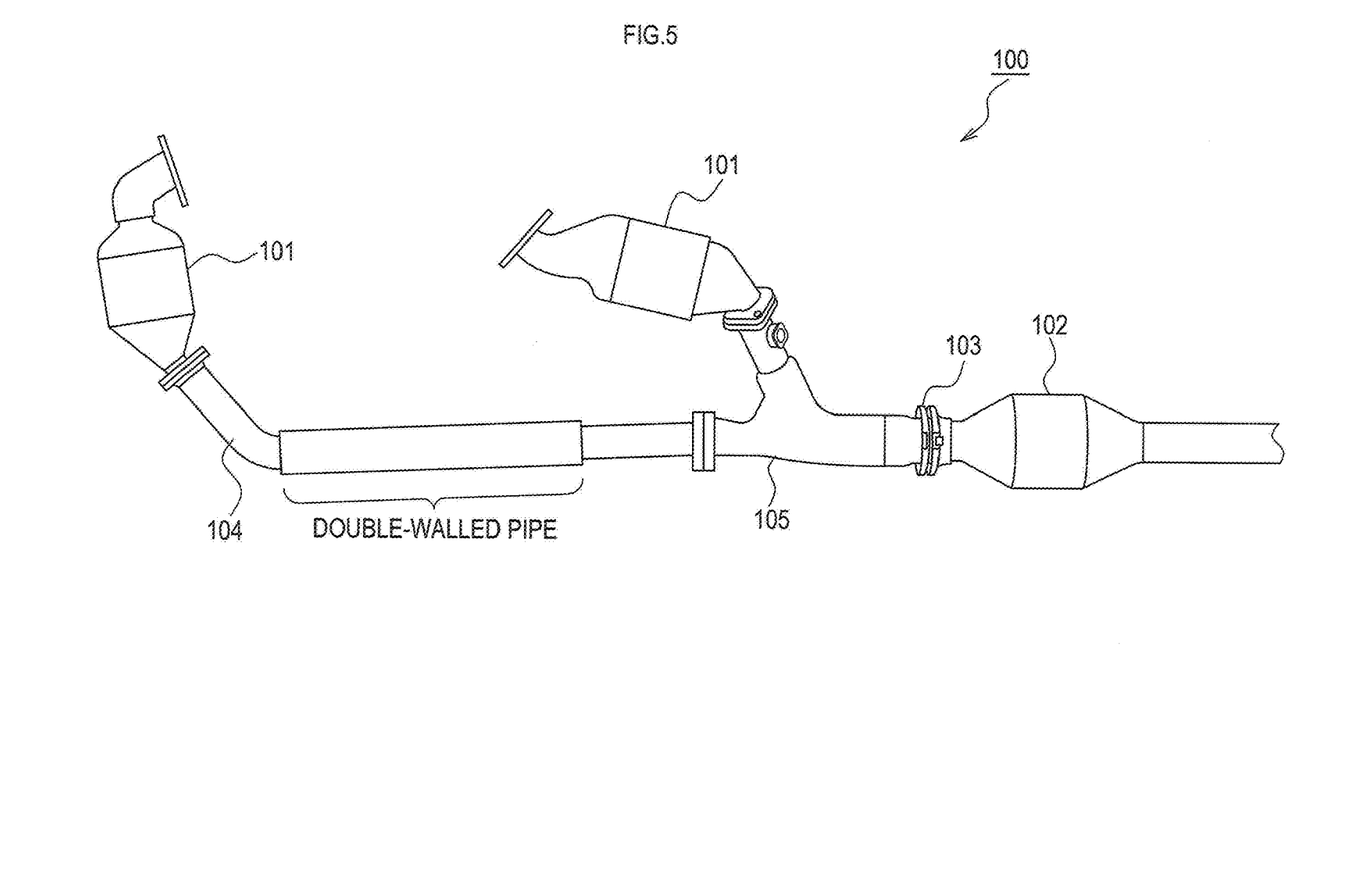
FIG. 5 is a front view of an exhaust device described in the Background Art section.

Accordingly, as shown in FIG. 5, an exhaust device 100 is formed in a shape so as to take exhaust gas thereinto from the front and rear of the internal combustion engine. In this exhaust device 100, an exhaust manifold (exhaust manifold) comprising first catalysts 101 are mounted at the front and rear of the internal combustion engine.

Also, a Y-shaped exhaust junction pipe 103, which collects exhaust gases sent from each of the first catalysts 101, is mounted rearward of the rear-side first catalyst 101. Disposed further rearward of the exhaust junction pipe 103 is a second catalyst 102.

This exhaust junction pipe 103 is mounted rearward of the rear-side first catalyst 101. Because the exhaust junction pipe 103 is away from the front-side first catalyst 101, the exhaust junction pipe 103 and this first catalyst 101 are coupled via an elongated exhaust pipe 104 extending from the exhaust junction pipe 103.

As explained above, in the exhaust device 100 to be coupled to the transversely-placed internal combustion engine, exhaust gas passages from each of the first catalysts 101 to the second catalyst 102 have different lengths from one another. The exhaust pipes 103 and 104 forming such exhaust gas passages are called as an unequal-length exhaust pipe.

Figure 6:
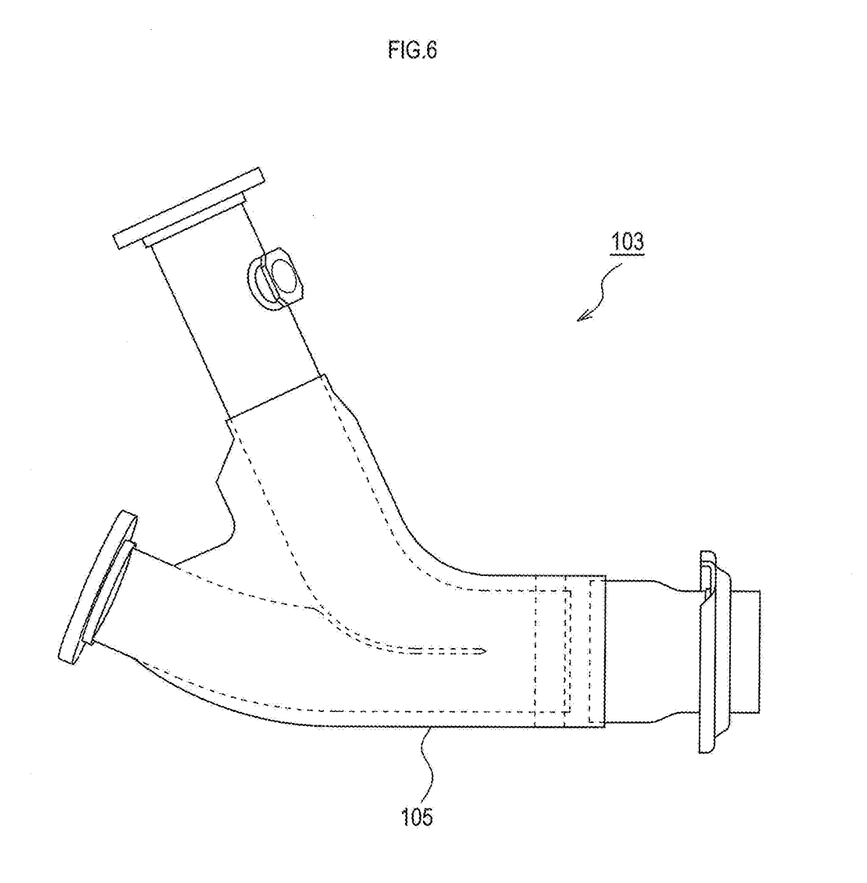
FIG. 6 is a front view showing an exhaust junction pipe described in the Background Art section, in which part of the exhaust junction pipe is shown in a transparent view.

In this regard, as shown in FIG. 6, the exhaust junction pipe 103 is formed to be generally Y-shape having three branch parts; the exhaust junction pipe 103 is disposed such that two branch parts are directed to the front side (the internal combustion engine-side) and that the remaining one branch part is directed to the rear side.

Moreover, a cover 105 for inhibiting heat dissipation is attached to the exhaust junction pipe 103 (Patent Document 1).

This cover 105 is very large and covers most of the exhaust junction pipe 103, except for end-side portions of the two branch parts of the three branch parts.

One purpose of inhibiting heat dissipation is, in a case where a catalyst, such as the above-described second catalyst 102 (see FIG. 5), is provided downstream of the exhaust junction pipe 103, to maintain a temperature of exhaust gas flowing into the catalyst at a specified temperature or more, in view of catalytic activity.

For this purpose, as shown in FIG. 5, in the exhaust device 100, a part of the exhaust pipe 104 is formed to be a double-walled pipe structure so as to inhibit heat dissipation.

Moreover, the cover 105 is fixed to the exhaust junction pipe 103 by welding. Specifically, front-side ends of the cover 105, i.e., the ends to be connected to the first catalyst 101 or the exhaust pipe 104, are welded to the branch parts, other than the branch part to which the second catalyst 102 is coupled.

On the other hand, a rear-side end of the cover 105, i.e., the end to be connected to the second catalyst 102, is not welded to the branch part. The reason is as follows: because the cover 105 is fixed at the upstream-side, breakage of the cover 105 may be caused by difference between an amount of heat expansion of the exhaust junction pipe 103 and an amount of heat expansion of the cover 105.

However, if the rear-side end of the cover 105 is not welded, heat may be dissipated from inside of the cover 105; moreover, the exhaust junction pipe 103 and/or the cover 105 may be broken due to mechanical vibrations.

Figure 7:
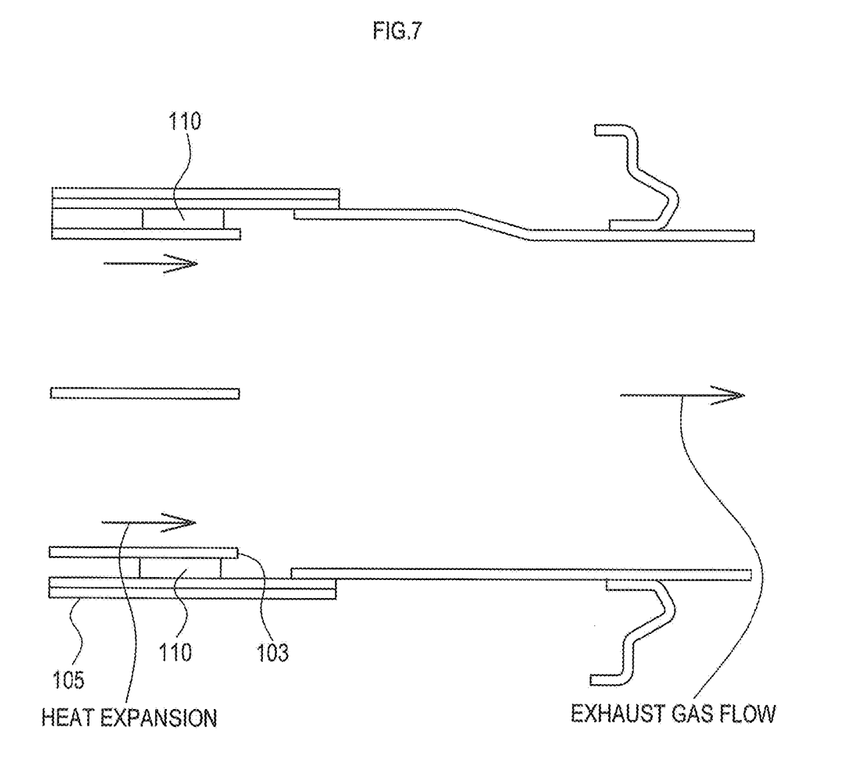
FIG. 7 is a schematic diagram illustrating a structure for attaching a cover to the exhaust junction pipe described in the Background Art section.

In view of the above, as shown in FIG. 7, the rear-side end of the cover 105 is fixed to the exhaust junction pipe 103 such that a mesh 110 is held between the rear-side end of the cover 105 and the exhaust junction pipe 103.

By holding the mesh 110 therebetween, the mechanical vibrations can be absorbed, and heat dissipation from the rear-side end of the cover 105 can be inhibited.

PRIOR ART DOCUMENTS

Patent Documents

Patent Document 1: Unexamined Japanese Utility Model Application Publication No. H5-96432

SUMMARY OF THE INVENTION

Problems to be Solved by the Invention

The exhaust device 100, however, involves various problems: for example, the cover 105 is very large and the mesh 110 needs to be held by the cover 105, the structure for attaching the cover 105 to the exhaust junction pipe 103 is complicated; the exhaust pipe 104 needs to be formed as a double-walled pipe.

In one aspect of the present invention, it is desirable to provide a heat insulating structure for an exhaust junction pipe, in which a cover is downsized, a complicated structure is eliminated, and with which heat insulation is unnecessary in areas other than the exhaust junction pipe.

Means for Solving the Problems

A heat insulating structure in one aspect of the present invention is a heat insulating structure for an exhaust junction pipe to be disposed in an area in which exhaust gas passages having different respective lengths are merged together, and the heat insulating structure comprises a first heat insulation portion that covers and provides heat insulation for at least a portion of one branch part of branch parts that are branched in the exhaust junction pipe; the one branch part forms one exhaust gas passage in a not-yet-merged state of the exhaust gas passages, and the one branch part forms the one exhaust gas passage having a short length.

The inventors found that exhaust gas flowing from a long exhaust gas passage picks up heat and this heat has been dissipated before reaching to the exhaust junction pipe; therefore, if heat dissipation of exhaust gas flowing through a short exhaust gas has is inhibited, a temperature of the exhaust gas after being merged becomes equivalent to a temperature in the case of the exhaust device described in the Background Art section.

Accordingly, the above-described configuration can inhibit heat dissipation in the exhaust junction pipe, in the same manner as in the exhaust device described in the Background Art section. Moreover, with this configuration, only the branch part forming the short exhaust gas passage needs to be covered and thus, a size of the cover (the first heat insulation portion) can be reduced.

Moreover, because this first heat insulation portion covers only the branch part forming the short exhaust gas passage, there is no need to take into consideration of amounts of heat expansion of the other branch parts. Thus, both ends of the first heat insulation portion can be welded all around to the branch part so as to be firmly attached to the branch part.

Also, when heat of the branch part forming the short exhaust gas passage is insulated, a temperature of exhaust gas after being merged becomes equivalent to a temperature in the case of the exhaust device described in the Background Art section. Accordingly, it is not necessary to insulate heat in other parts, except for the exhaust junction pipe. For this reason, an exhaust pipe to be coupled to the branch part forming the long exhaust gas passage does not need to have a double-walled structure.

In the aforementioned heat insulating structure, the first heat insulation portion may comprise an outer cylinder that covers a circumference of the one branch part forming the one exhaust gas passage having the short length, and comprises a heat insulating material that is filled between the outer cylinder and the one branch part.

Because the first heat insulation portion has a simple structure, even if a heat insulating material is filled into the first heat insulation portion, such a structure of the first heat insulation portion is not complicated. Moreover, the outer cylinder may be formed of a heat insulation member, such as a stainless heat-shield plate, and grasswool may be used as the heat insulating material.

In the aforementioned heat insulating structure, in a case where a catalyst for purifying exhaust gas is installed downstream of the exhaust junction pipe, the first heat insulation portion may cover the one branch part over a length thereof, with the length the first heat insulation portion being capable of maintaining a temperature at which a catalytic activity necessary for the catalyst to purify the exhaust gas is exhibited.

In the above-described configuration, when the first heat insulation portion, i.e., the cover, is small, the catalyst can maintain necessary catalytic activity.

Moreover, a second heat insulation portion may be provided, which covers and provides heat insulation for at least a portion of another branch part of a plurality of the branch parts and the another branch part forms one exhaust passage in a merged state of the exhaust gas passages.

In the above-described configuration, the heat that the exhaust gas after being merged picks up is not dissipated, a temperature of the exhaust gas after being merged is the same temperature as in the case of the exhaust device described in the Background Art section.

Moreover, the second heat insulation portion may comprise an outer cylinder that covers a circumference of the another branch part forming the one exhaust gas passage in the merged state, and a heat insulating material that is filled between the outer cylinder and the another branch part.

The second heat insulation portion is configured to dissipate heat by covering at least a portion of the branch part forming the exhaust gas passage that is not merged; accordingly, the structure can be simplified.

Next, in a case where the catalyst for purifying exhaust gas is installed downstream of the exhaust junction pipe, the first heat insulation portion and the second heat insulation portion may, respectively, cover the one branch part forming the one exhaust gas passage having the short length over a length of the one branch part, and the another branch part forming the one exhaust gas passage in the merged state over a length of the another branch part, with the lengths the first heat insulation portion and the second heat insulation portion being capable of cooperatively maintaining a temperature at which a catalytic activity necessary for the catalyst to purify the exhaust gas is exhibited.

In the above-described configuration, the first heat insulation portion and the second heat insulation portion, i.e., the covers, are downsized, the catalyst can maintain necessary catalytic activity.

Moreover, even when a temperature at which catalytic activity is generated cannot be maintained by the first heat insulation portion alone and/or by the second heat insulation portion alone, the first heat insulation portion and the second heat insulation portion are configured to cooperate with each other so as to maintain the temperature; thus, the first heat insulation portion and the second heat insulation portion can be downsized, compared with cases where the first heat insulation portion alone maintains the temperature and where the second heat insulation portion alone maintains the temperature.

EXPLANATION OF REFERENCE NUMERALS

1 . . . exhaust device, 3 . . . exhaust junction pipe, 4 . . . first heat insulation tool, 5 . . . second heat insulation tool, 10, 11 . . . first catalyst, 12 . . . exhaust pipe, 13 . . . second catalyst, 31 . . . first branch part, 32 . . . second branch part, 33 . . . third branch part, 40 . . . heat insulating material, 41 . . . outer cylinder, 50 . . . heat insulating material, 51 . . . outer cylinder

MODE FOR CARRYING OUT THE INVENTION

Hereinafter, a heat insulating structure for an exhaust junction pipe, which is an embodiment of the present invention, will be described with reference to the drawings.

Figure 1:
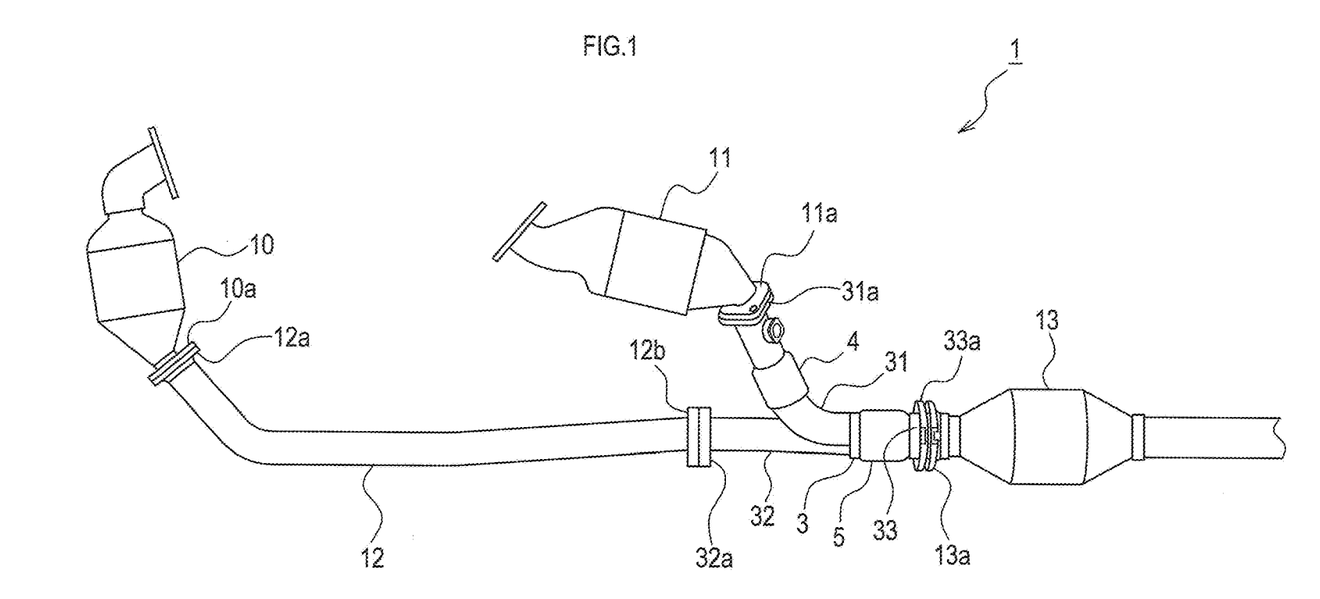
FIG. 1 is a front view of an exhaust device of the present embodiment.

An exhaust device 1 in the present embodiment is, as shown in FIG. 1, to be applied to a vehicle in which a V-type engine is transversely placed.

The exhaust device 1 comprises a first catalyst 10 and a first catalyst 11; the first catalyst 10 is directly mounted to an exhaust manifold coupled to a front side of the V-type engine; and the first catalyst 11 is directly mounted to the exhaust manifold coupled to a rear side of the V-type engine.

An exhaust pipe 12 is coupled to the first catalyst 10, and the exhaust pipe 12 is provided to extend toward an exhaust junction pipe 3 located further rearward of the first catalyst 11. The exhaust pipe 12 are provided with flanges 12a and 12b on both ends thereof. The exhaust pipe 12 is a single-walled pipe.

The flange 12a provided at a front side of the exhaust pipe 12 is overlapped with a flange 10a provided at a lower end side of the first catalyst 10. The flanges 10a and 12a are screwed to each other, thereby coupling the first catalyst 10 to the exhaust pipe 12.

The exhaust pipe 12 and the first catalyst 11 provided at the rear side are coupled to the exhaust junction pipe 3 disposed downstream of the exhaust pipe 12 and the first catalyst 11. The exhaust junction pipe 3 is an exhaust pipe that has a bifurcated configuration at an upstream side thereof and that is formed in a generally Y-shape.

In the exhaust junction pipe 3, the upstream-side bifurcated branching portions and a downstream-side portion are each referred to as "branch part"; among these branch parts, the branch part to be coupled to the first catalyst 11, the branch part to be coupled to the exhaust pipe 12, and the downstream-side branch part are respectively referred to as a first branch part 31, a second branch part 32, and a third branch part 33.

The branch parts 31 to 33 forming the exhaust junction pipe 3 are respectively provided with flanges 31a to 33a at respective ends thereof.

The first catalyst 11 and the first branch part 31 are coupled to each other such that a flange 11a provided at a lower end side of the first catalyst 11 is overlapped with the flange 31a of the first branch part 31, and these flanges 11a and 31a are screwed to each other.

The exhaust pipe 12 and the second branch part 32 are coupled to each other such that the flange 12b provided at the rear end side of the exhaust pipe 12 is overlapped with the flange 32a of the second branch part 32, and these flanges 12b and 32a are screwed to each other.

A second catalyst 13 is coupled to a rear side of the exhaust junction pipe 3.

At a front side of the second catalyst 13, a flange 13a is provided. The flange 33a of the third branch part 33 of the exhaust junction pipe 3 is overlapped with the flange 13a, and these flanges 13a and 33a are screwed to each other; consequently, the exhaust junction pipe 3 and the second catalyst 13 are coupled to each other.

In the above-described exhaust device 1, a long exhaust gas passage extending from the first catalyst 10 via the exhaust pipe 12 to the exhaust junction pipe 3, and a short exhaust gas passage extending from the first catalyst 11 to the exhaust junction pipe 3.

As described above, the exhaust device 1 of the present embodiment comprises the exhaust gas passages having different lengths; hereinafter, as needed, the exhaust pipe 12 and the exhaust junction pipe 3 are referred to as "unequal-length exhaust pipe".

In this regard, because the exhaust junction pipe 3 is configured in the above-described manner, among the exhaust gas passages having different lengths, the first branch part 31 forms the short exhaust gas passage, and the second branch part 32 forms the long exhaust gas passage. Moreover, the third branch part 33 forms an exhaust gas passage in a merged state.

Figure 2:
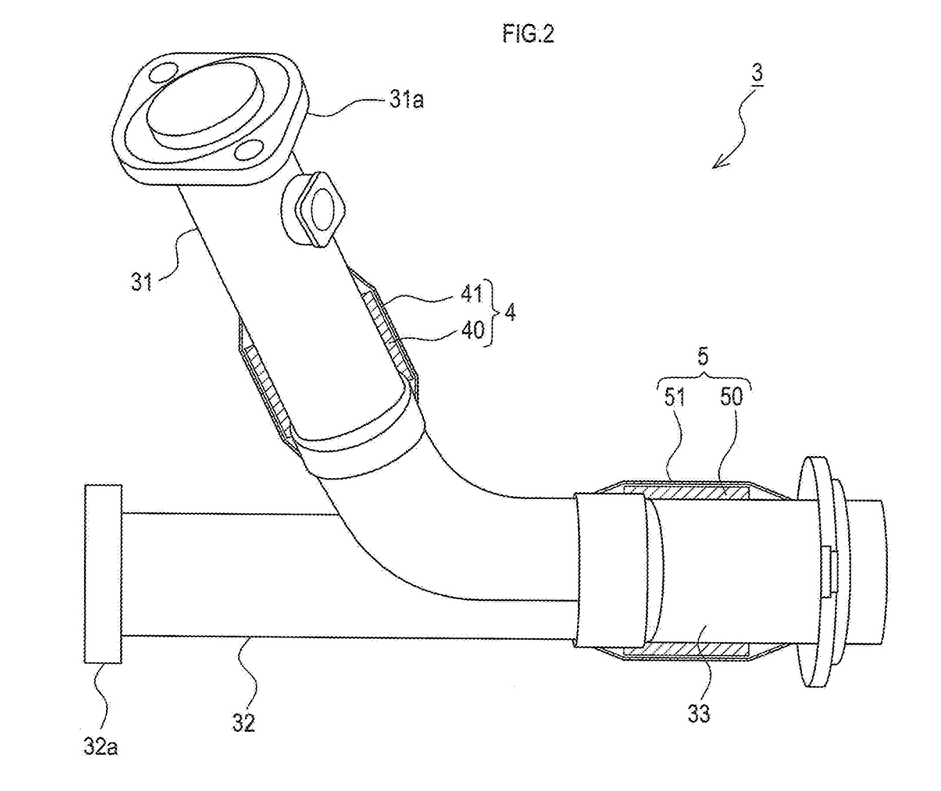
FIG. 2 is a front view of an exhaust junction pipe of the present embodiment, in which a first heat insulation tool 4 and a second heat insulation tool 5 are shown in a cutaway view in a cross section taken along an axial direction and an up-and-down direction.

Next, with reference to FIG. 2, a first heat insulation tool 4 to be attached to the branch part 31 and a second heat insulation tool 5 to be attached to the branch part 33 will be explained.

Among the branch parts 31 to 33 forming the exhaust junction pipe 3, the first heat insulation tool 4 is attached to the first branch part 31 to be coupled to the first catalyst 11; and the second heat insulation tool 5 is attached to the third branch part 33 to be coupled to the second catalyst 13.

The first heat insulation tool 4 comprises an outer cylinder 41 formed in a generally cylindrical shape, and a heat insulating material 40 that is filled between an inner wall surface of the outer cylinder 41 and an outer wall surface of the first branch part 31; the second heat insulation tool 5 comprises an outer cylinder 51 formed in a generally cylindrical shape, and a heat insulating material 50 that is filled between an inner wall surface of the outer cylinder 51 and an outer wall surface of the third branch part 33.

Both end parts of the outer cylinder 41 and both end parts of the outer cylinder 51 have reduced diameters. Both ends of the outer cylinder 41 are welded all around to the first branch part 31 on an outer wall surface thereof; both ends of the outer cylinder 51 are welded all around to the third branch part 33 on an outer wall surface thereof.

The outer cylinders 41 and 51 are formed of a heat shield plate made of stainless steel. The heat insulating materials 40 and 50 are formed of grass wool.

Moreover, the first heat insulation tool 4 is formed to have a length of 15 cm or less along an axial direction of the first branch part 31.

Next, with reference to FIGS. 3A and 3B, an experiment that was conducted to compare the present embodiment and the exhaust device described in the Background Art section will be explained.

The exhaust device described in the Background Art section was explained in the Background Art section with reference to FIGS. 5 to 7; this exhaust device comprises the cover 105 that is very large and covers most of the exhaust junction pipe 103; this exhaust device is formed such that a part of the exhaust pipe 104 is configured as a double-walled pipe.

Here, the experiment was conducted in which a temperature of exhaust gas inside the second catalyst 13 was measured at a specific time interval after start of the V-type engine.

Figure 3A:
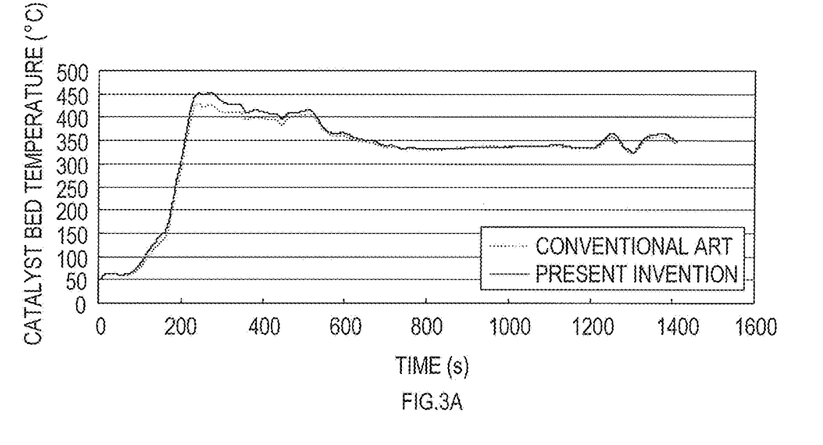
FIG. 3A is a graph showing experimental results of heat insulation effects in the present embodiment.

Upon comparing these, as shown in FIG. 3A, it is noted that, when the heat insulating structure for the exhaust junction pipe 3 described in the present embodiment (the structure in which the first heat insulation tool 4 is attached to the first branch part 31, and the second heat insulation tool 5 is attached to the third branch part 33) is adopted, such a structure in the present embodiment exhibits a heat insulation effect that is equivalent to or more excellent than such an effect obtained by a heat insulating structure of the exhaust device described in the Background Art section. Especially, upon comparing the lowest temperatures in the part indicated by the reference symbol a in FIG. 3B, despite having a smaller covered area, the present embodiment obtained results equivalent to those obtained in the exhaust device described in the Background Art section.

The exhaust gas flowing through the long exhaust gas passage picked up heat, and this heat has been dissipated before the exhaust gas reaches to the exhaust junction pipe 3. In this regard, a temperature of the exhaust gas after being merged greatly depends on a temperature of the exhaust gas flowing through the short exhaust gas passage. Accordingly, it can be understood that because the first heat insulation tool 4 inhibits heat dissipation of the exhaust gas that flows through the first branch part 31, the heat insulating structure of the present embodiment produces a heat insulation effect equivalent to or more excellent than a heat insulation effect achieved by the heat insulating structure of the exhaust device described in the Background Art section, as shown in FIGS. 3A and 3B.

As has been described above, the present embodiment produces the following characteristic operation and effect.

In the exhaust device 1 of the present embodiment, the first heat insulation tool 4 covers the first branch part 31 of the exhaust junction pipe 3; therefore, the exhaust device 1 can achieve a heat insulation effect equivalent to or more excellent than a heat insulation effect achieved by the exhaust device described in the Background Art section.

Figure 3B:
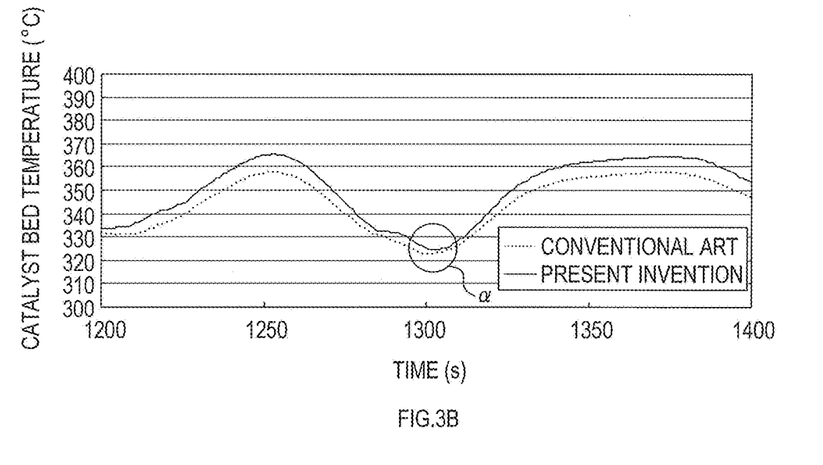
FIG. 3B is a graph of a portion between 1200 seconds and 1400 seconds extracted from the graph in FIG. 3A.
Figure 4:
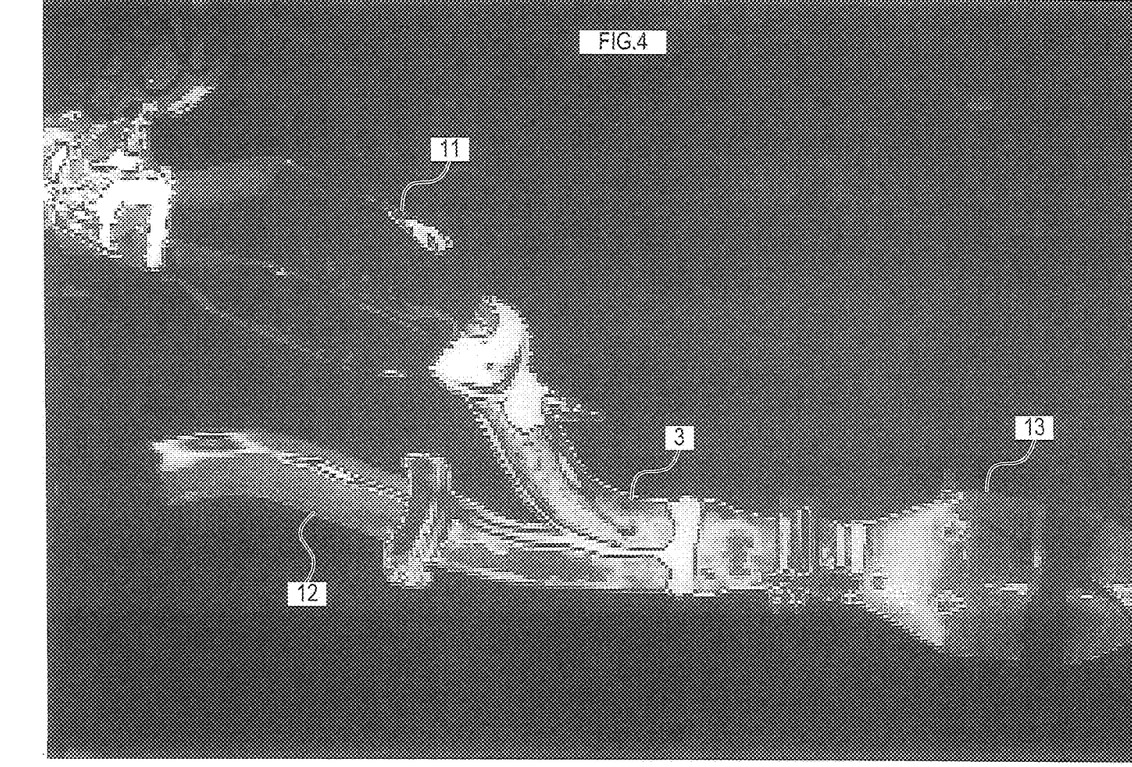
FIG. 4 is a photographic image of heat dissipation in the exhaust junction pipe of the present embodiment, which was taken using thermography.

In addition, from the experimental results in FIGS. 3A and 3B, it can be understood that if heat dissipation of the exhaust gas that flows through the first branch part 31 forming the short exhaust gas passage is inhibited, a heat insulation effect equivalent to or more excellent than a heat insulation effect achieved by the exhaust device described in the Background Art section is exhibited. Accordingly, if at least the first branch part 31 is covered with the first heat insulation tool 4, the exhaust device 1 of the present embodiment can exhibit a heat insulation effect equivalent to or more excellent than a heat insulation effect achieved by the exhaust device described in the Background Art section.

Moreover, in the exhaust device 1 of the present embodiment, the second heat insulation tool 5 is used to cover a portion of the third branch part 33 forming the exhaust gas passage in the merged state, thereby provide heat insulation for such a portion of the third branch part 33. Therefore, heat that merged exhaust gas picks up is not dissipated.

Accordingly, the first heat insulation tool 4 and the second heat insulation tool 5 need to have sufficient sizes so as to, respectively, cover the first branch part 31 at least over a specified length thereof and the third branch part 33 at least over a specified length thereof; with the respective lengths, the first heat insulation tool 4 and the second heat insulation tool 5 can cooperatively maintain a temperature at which a catalytic activity necessary for the second catalyst 13 to purify exhaust gas is exhibited.

Because the first heat insulation tool 4 covers the first branch part 31 only, the first heat insulation tool 4 can be made smaller in size than the cover of the exhaust device described in the Background Art section.

In addition, in terms of maintaining the heat that the merged exhaust gas picks up, because the second heat insulation tool 5 is provided, the first heat insulation tool 4 can be reduced in length corresponding to the heat insulation achieved by the second heat insulation tool 5; accordingly, the size of the first heat insulation tool 4 can be further reduced.

Furthermore, the first heat insulation tool 4 and the second heat insulation tool 5 may have sizes sufficient to cover the first branch part 31 and the third branch part 33, respectively. Each of the first heat insulation tool 4 and the second heat insulation tool 5 may be formed smaller in size than the cover of the exhaust device described in the Background Art section. Consequently, weight of the exhaust junction pipe 3 can be reduced by nearly 30 percent, compared with the exhaust device described in the Background Art section; moreover, materials used to form the exhaust junction pipe 3 can be reduced. Thus, compared with the exhaust device described in the Background Art section, manufacturing costs of the exhaust junction pipe 3 can be reduced.

Moreover, the first heat insulation tool 4 is attached only to the first branch part 31, and the second heat insulation tool 5 is attached only to the third branch part 33; in this case, there is no need to take into consideration of amounts of heat expansion of the other branch parts. Therefore, the first heat insulation tool 4 and the second heat insulation tool 5 can be firmly fixed, respectively, to the first branch part 31 and the third branch part 33 by welding all around thereto.

Furthermore, in the exhaust device 1 of the present embodiment, heat insulation of the first branch part 31 and the third branch part 33 are achieved, respectively, by the first heat insulation tool 4 and the second heat insulation tool 5. In this case, the exhaust device 1 of the present embodiment can achieve a heat insulation effect equivalent to or more excellent than in the case of the exhaust device described in the Background Art section. Thus, a single-walled pipe can be used as the exhaust pipe 12.

[Other Embodiments]

(1) The exhaust device 1 described in the aforementioned embodiment is just one example, and should not be limited to this example.

(2) In the aforementioned embodiment, the outer cylinders 41 and 51 are formed of a heat shield plate made of stainless steel; however, it should not be limited to this. Moreover, the heat insulating materials 40 and 50 are made of grass wool; however, it should not be limited to this.

(3) Elements of the present invention are conceptual, and should not be limited to those in the above-described embodiment. For example, functions that one element has may be divided among a plurality of elements, or functions that a plurality of elements have may be integrated to one element. Moreover, at least part of the configuration of the above-described embodiment may be replaced with a known configuration having the same function. Furthermore, at least part of the configuration in the aforementioned embodiment may be added to, replaced with, etc. a configuration in the aforementioned other embodiments.

What is claimed is:

1. A heat insulating structure for an exhaust junction pipe to be disposed in an area in which exhaust gas passages having different respective lengths are merged together, the heat insulating structure comprising:
    a first heat insulation portion that provides heat insulation for and covers all or a part of only a first branch part of a plurality of branch parts that are branched in the exhaust junction pipe, the first branch part forming one exhaust gas passage in a not-yet-merged state of the exhaust gas passages, the first branch part forming the one exhaust gas passage having a short length, wherein a second branch part of a plurality of branch parts that is in a not-yet-merged state of the exhaust gas passages and is different from the first branch part is connected with an exhaust pipe, and heat insulation is not provided for the second branch part and the exhaust pipe.

2. The heat insulating structure for the exhaust junction pipe according to claim 1, wherein the first heat insulation portion comprises:

an outer cylinder that covers a circumference of the first branch part forming the one exhaust gas passage having the short length; and a heat insulating material that is filled between the outer cylinder and the first branch part.

3. The heat insulating structure for the exhaust junction pipe according to claim 1, wherein, in a case where a catalyst for purifying exhaust gas is installed downstream of the exhaust junction pipe, the first heat insulation portion covers the first branch part over a length thereof, with the length the first heat insulation portion being capable of maintaining a temperature at which a catalytic activity necessary for the catalyst to purify the exhaust gas is exhibited.

4. The heat insulating structure for the exhaust junction pipe according to claim 1, further comprising:

a second heat insulation portion that covers and provides heat insulation for at least a portion of a third branch part of a plurality of the branch parts, the third branch part forming one exhaust passage in a merged state of the exhaust gas passages.

5. The heat insulating structure for the exhaust junction pipe according to claim 4, wherein the second heat insulation portion comprises:

an outer cylinder that covers a circumference of the third branch part forming the one exhaust gas passage in the merged state; and a heat insulating material that is filled between the outer cylinder and the third branch part.

6. The heat insulating structure for the exhaust junction pipe according to claim 4, wherein, in a case where the catalyst for purifying exhaust gas is installed downstream of the exhaust junction pipe, the first heat insulation portion and the second heat insulation portion, respectively, cover the first branch part forming the one exhaust gas passage having the short length over a length of the first branch part, and the third branch part forming the one exhaust gas passage in the merged state over a length of the third branch part, with the lengths the first heat insulation portion and the second heat insulation portion being capable of cooperatively maintaining a temperature at which a catalytic activity necessary for the catalyst to purify the exhaust gas is exhibited.

7. An exhaust junction pipe system comprising:

an exhaust junction pipe comprising a first branch part, a second branch part, and a third branch part, wherein the first branch part forms a short exhaust gas passage which is shorter than a longer exhaust gas passage formed by the second branch part, and wherein the third branch part forms an exhaust gas passage in a merged state with the first and the second branch parts; and a heat insulating structure comprising a first heat insulation portion that provides heat insulation for and covers all or a part of only the first branch part, wherein the second branch part is connected with an exhaust pipe, and heat insulation is not provided for the second branch part and the exhaust pipe.

8. The exhaust junction pipe system of claim 7, wherein the first heat insulation portion comprises:

an outer cylinder that covers a circumference of the first branch part; and a heat insulating material that is filled between the outer cylinder and the first branch part.

9. The exhaust junction pipe system of claim 7, wherein, in a case where a catalyst for purifying exhaust gas is installed downstream of the exhaust junction pipe, the first heat insulation portion covers the first branch part over a length thereof, with the length the first heat insulation portion being capable of maintaining a temperature at which a catalytic activity necessary for the catalyst to purify the exhaust gas is exhibited.

10. The exhaust junction pipe system of claim 7, wherein the heat insulating structure further comprises a second heat insulation portion that provides heat insulation for and covers only at least a portion of the third branch part.

11. The exhaust junction pipe system of claim 10, wherein the second heat insulation portion comprises:

an outer cylinder that covers a circumference of the third branch part; and a heat insulating material that is filled between the outer cylinder and the third branch part.

12. The exhaust junction pipe system of claim 10, wherein, in a case where the catalyst for purifying exhaust gas is installed downstream of the exhaust junction pipe, the first heat insulation portion and the second heat insulation portion cover at least a portion of the first branch having a first length and at least a portion of the third branch part having a second length, respectively, wherein the first and second lengths are configured to cooperatively maintain a temperature at which a catalytic activity necessary for the catalyst to purify the exhaust gas is exhibited.

13. The exhaust junction pipe system of claim 10, wherein the first branch part, the second branch part, and the third branch part each include a flange.

\* \* \* \* \*